United States Patent
Kaster (10) Patent No.: US 7,251,553 B2
(45) Date of Patent: Jul. 31, 2007

(54) THERMAL OPTIMIZATION OF EMI COUNTERMEASURES

(75) Inventor: Robert Kaster, White Lake, MI (US)

(73) Assignee: Robert Bosch Corporation, Broadview, IL (US)

( * ) Notice: Subject to any disclaimer, the term of this patent is extended or adjusted under 35 U.S.C. 154(b) by 0 days.

(21) Appl. No.: 10/427,070

(22) Filed: Apr. 30, 2003

(65) Prior Publication Data

US 2004/0220713 A1    Nov. 4, 2004

(51) Int. Cl.
*G06F 7/00*    (2006.01)
*F02P 19/00*    (2006.01)

(52) U.S. Cl. ............... 701/36; 123/143 R; 123/171.1; 701/102

(58) Field of Classification Search ............ 701/36, 701/1; 280/1; 180/313; 324/200, 600, 158.1; 374/210
See application file for complete search history.

(56) References Cited

U.S. PATENT DOCUMENTS

| | | | | |
|---|---|---|---|---|
| 3,757,199 A | * | 9/1973 | Minks | 322/28 |
| 3,891,986 A | * | 6/1975 | Lipe et al. | 340/474 |
| 4,104,998 A | * | 8/1978 | Fenn | 123/406.52 |
| 4,143,264 A | * | 3/1979 | Gilbert et al. | 250/210 |
| 4,464,065 A | * | 8/1984 | Wolf et al. | 374/121 |
| 5,329,204 A | * | 7/1994 | Ricca | 315/82 |
| 5,408,203 A | | 4/1995 | Okano et al. | |
| 5,621,277 A | * | 4/1997 | Ricca | 315/86 |
| 5,673,165 A | | 9/1997 | Kuhn et al. | |
| 5,703,416 A | | 12/1997 | Hinkle et al. | |
| 6,043,567 A | | 3/2000 | Uhler et al. | |
| 6,051,952 A | | 4/2000 | Moreira et al. | |
| 6,148,258 A | * | 11/2000 | Boisvert et al. | 701/99 |
| 6,205,031 B1 | | 3/2001 | Herzog et al. | |
| 6,305,506 B1 | * | 10/2001 | Shirai et al. | 188/72.2 |
| 6,323,564 B1 | | 11/2001 | Graf | |
| 6,353,540 B1 | | 3/2002 | Akiba et al. | |
| 6,404,041 B1 | | 6/2002 | Gantioler et al. | |
| 6,426,609 B2 | | 7/2002 | Tanaka et al. | |
| 6,653,831 B2 | * | 11/2003 | Friend et al. | 324/244 |

(Continued)

FOREIGN PATENT DOCUMENTS

DE    3834514 C2 *    2/1996

(Continued)

OTHER PUBLICATIONS

Halas et al (Nov. 1993) A bridge-based temperature controller with resistor as temperature sensor and heater. Abstract in electric journals (Measurement Science and Tech.)*

(Continued)

*Primary Examiner*—Cuong Nguyen
(74) *Attorney, Agent, or Firm*—Michael Best & Friedrich LLP (57) ABSTRACT

The present invention provides an electronic circuit and EMI countermeasure for an automotive electronic control unit that provides a maximum amount of EMI protection under normal operating conditions, i.e., ambient temperatures. The effectiveness of the EMI countermeasure is limited at extremely high temperatures. The electronic circuit and EMI countermeasure optimizes the effectiveness of EMI countermeasures as a function of temperature to improve performance under normal conditions.

7 Claims, 4 Drawing Sheets

U.S. PATENT DOCUMENTS

2001/0019493 A1    9/2001  Eisenhardt et al.
2004/0220713 A1*  11/2004  Kaster ........................ 701/36

FOREIGN PATENT DOCUMENTS

| EP | 459506 A   | * | 12/1991 |
| EP | 707377 A1  | * | 4/1996  |
| FR | 2546294 A  | * | 11/1984 |
| JP | 63276566 A | * | 11/1988 |
| SU | 1566229 A  | * | 5/1990  |

OTHER PUBLICATIONS

College Physics II, Lab 6: RC circuits by Peter Rolnick with Taner Edis Spriing 2002 pp. 1-6.*

PHY 242 General Physics II Laboratory notes Fall 2000. Rc circuits 2 pages.*

Capacitors and RC circuits 3 pages 1996 Kenneth Koehler.*

Zocholl et al., Using thermal limit curves to define thermal models of induction motors, Wchwitzer Engineering Laboratories, Inc., 2001.*

Schilz, Thermoelectric infrared sensors (thermopiles) remote temperature measurements; pyromet, PerkinElmer Optoelectronics GmbH, Jul. 11, 2000.*

Unknown author, "5.3.6 High side PWM lamp dimmer using TOPFET", Automotive Power Electronics, pp. 455-456, Power Semiconductor Applications of Phillips Semiconductors.*

IEEE Std 1100-2005 IEEE Recommended Practice for Powering and Grounding Electronic Equipment 2006, pp. 1-589.*

Neil Goldsman, High Frequency Response Using Miller's Approximation, http://www.ee.umd.edu/~bassel/man/node72.html, Oct. 23, 1998.

Stanislaw Halas et al., "A Bridge-Based Temperature Controller with a Resistor as Temperature Sensor and Heater," Measurement Science & Technology, 1993, 1208-1212.

* cited by examiner

THERMAL OPTIMIZATION OF EMI COUNTERMEASURES

FIELD OF THE INVENTION

The invention generally relates to methods and systems for ensuring electromagnetic compatibility ("EMC") in automotive systems. More specifically, the invention relates to adjusting the operation of EMC devices and EMI countermeasures to account for or otherwise take into consideration temperature and thermal effects.

BACKGROUND OF THE INVENTION

The reliability, low cost, and ability to provide control over a wide variety of devices, systems, and processes has made electronic circuits and devices ubiquitous. However, like any other technology, electronic devices are designed as a trade-off among mutually exclusive constraints. One weakness of electronic devices is their susceptibility to performance degradation when subjected to electromagnetic interference ("EMI"). EMI is produced by a variety of sources (e.g., transformers, stray radio signals, motors, heat, and other machines and sources that generate electric or magnetic fields.) Most, if not all, electronic devices are susceptible to EMI from one source or another under the right conditions.

Electronic circuits and devices are utilized in many automotive applications. The electronic circuits utilized in automobiles are generally designed to be electromagnetically compatible with each other, such that one electronic circuit does not interfere with the functioning of a near-by electronic circuit. Electromagnetic compatibility relates to the ability of electronic and electrical equipment and systems to operate without adversely affecting other electrical or electronic equipment or being affected by other sources of interference.

In many cases EMC is achieved using what are called EMI countermeasures or sometimes EMC countermeasures. Such countermeasures either reduce or eliminate the creation of interfering signals or counterbalance or cancel the signals or their effects. As noted, EMI countermeasures may cause excessive heat. Generally, electronic circuits are designed to accommodate a maximum thermal load. If the circuits are subjected to conditions beyond their limits, they will malfunction. In addition to heat caused by the operation of electronic and electric devices, the environmental temperature and other heat sources may combine to cause malfunctioning of electronic components and electronic circuits.

SUMMARY OF THE INVENTION

Accordingly, there is a need for improved EMI countermeasures, particularly countermeasures that perform in environments where excess heat can be problematic. The present invention provides an electronic circuit and EMI countermeasure for an automotive electronic control unit that provides a maximum amount of EMC protection under normal operating conditions, i.e., a range of typically encountered ambient temperatures. The effectiveness of the EMI countermeasure is reduced at extremely high temperatures. The electronic circuit and EMI countermeasure enhance the effectiveness of EMI countermeasures as a function of temperature to improve performance under normal conditions. This feature allows for a less-expensive housing to be used for an electronic control unit in which the electronic circuit (such as a control circuit) and EMI countermeasure are placed.

In one embodiment, the invention includes a method of controlling a device or module (generically referred to as an actuator). The method includes the acts of providing a control signal to an input circuit of a switch, the input circuit including a filter, the control signal having a plurality of peaks and a plurality of troughs and a plurality of edges, each edge running from one of the peaks to one of the troughs or one of the troughs to one of the peaks, controlling the speed of the plurality of edges by processing the control signal in the filter, the filter operable to maintain the speed of the edges at a relatively low value or rate in an ambient temperature range and to increase the speed of the edges at temperatures that are higher than the ambient temperature range, and providing the processed control signal to the switch.

In another embodiment, the invention includes a controller for controlling an actuator. The controller includes an input circuit having a first component that provides a resistance, a second component coupled in a parallel path with the first component, the second component providing a temperature-dependent resistance, and a third component that provides a capacitance. The controller also includes a switch operable to change from a first state to a second state according to a time constant determined by the input circuit.

In another embodiment, the invention includes a method of controlling a system. The method includes the acts of providing a control signal to an input circuit of a switch; calculating a time constant determined by the input circuit; processing and modifying the control signal according to the time constant; triggering a switch to adjust from a first state to a second state according to the modified control signal; and providing a current to the system when the switch is in the second state.

Additional objects and features of the invention are illustrated in the drawings and provided in the subsequent disclosure.

BRIEF DESCRIPTION OF THE DRAWINGS

FIG. 2 illustrates an exemplary schematic of an electronic circuit of one embodiment of the invention.

DETAILED DESCRIPTION

Before embodiments of the invention are explained in detail, it is to be understood that the invention is not limited in its application to the details of the examples set forth in the following description or illustrated in the drawings. The invention is capable of other embodiments and of being practiced or carried out in a variety of applications and in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as detector, or a crystal. The resistor 42 is positioned in path 54. The temperature-dependent resistor 46 is in a parallel path 58 with respect to the resistor 42. The resistor 42 and temperature-dependent resistor 46 form a network 60. In one embodiment, the resistor 42 has a value of 1 KΩ, the temperature-dependent resistor 46 is a thermistor with a value of 56 KΩ, and the capacitor 50 is a Miller capacitor with a value of 2.2 nF. The input circuit 34 may include additional elements or components in different configurations than shown in FIG. 2, and the values for each element or component may differ than as specified.

The electronic circuit 30 includes an actuator which in the embodiment shown takes the form of a module 62. More specifically, in the embodiment illustrated in FIG. 2, module 62 represents a power steering module. As is known, most modern vehicles have a power steering system. In general, the amount of power steering assist required at low speeds is significantly more than at high speeds. To achieve this, some automotive manufacturers use an electronic control unit to regulate the amount of power steering assist based on vehicle speed. FIG. 2 represents a simplified schematic of the output driver for one specific implementation. The module 62 is modeled as having an internal inductance and resistance indicated by an inductor 66 (L) and a resistor 70 (R2). More specifically, the resistor 70 represents the estimated internal resistance of the inductor 66. In the embodiment shown, the inductor 66 has a value of 6.35 mH and the resistor 70 has a value of 2.2Ω.

The electronic circuit 30 includes a driver circuit 74 having a transistor 78 (T1) positioned in path 82 and a diode 86 (D1) positioned in series in the path 82. The diode may be implemented by using a FET, where the gate of the FET is tied to ground (not shown). The driver circuit 74 includes a first input 90 (UZ), which is connected to the ignition switch (not shown) of the vehicle 10. The driver circuit 74 also includes a second input 94 ($V_{in}$), which is connected to the vehicle battery (not shown). The electronic circuit 30 includes a switch 98 (T2). Preferably, the switch 98 is a MOSFET transistor having an on and an off state.

In operation, when the vehicle 10 is running, power is supplied at the first input 90 to the electronic circuit 30. Power is also supplied from the vehicle battery (not shown) to the second input 94. The transistor 78 receives a voltage such that transistor 78 is in the on state during the operation detailed in this description.

Figure 3:
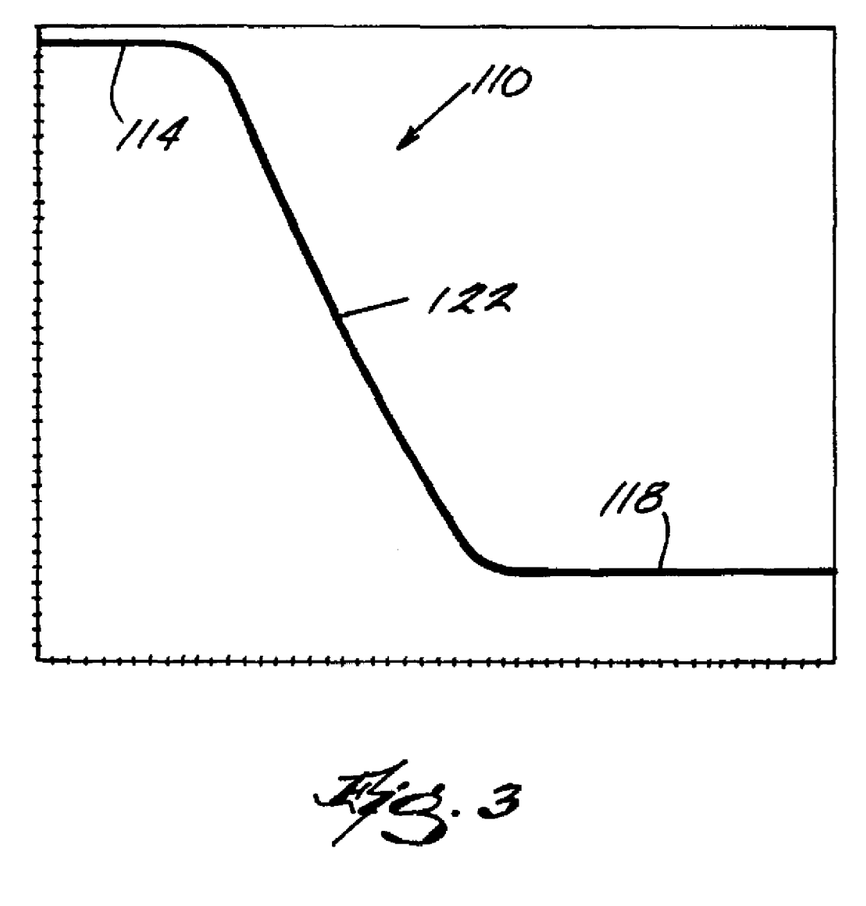
FIG. 3 illustrates an electronic input signal of one of the components in the electronic circuit.

The processor 26 receives data 106 from other systems in the vehicle, e.g., speed and steering wheel angle. The processor 26 processes the data and transmits a control signal 110 to the input circuit 34 of the electronic circuit 30. The control signal 110 is generally characterized as a pulse width modulated ("PWM") signal having a plurality of peaks, a plurality of troughs, and a plurality of edges. FIG. 3 illustrates an enlarged section of a control signal 110 having a peak 114, a trough 118, and an edge 122.

Figure 4:
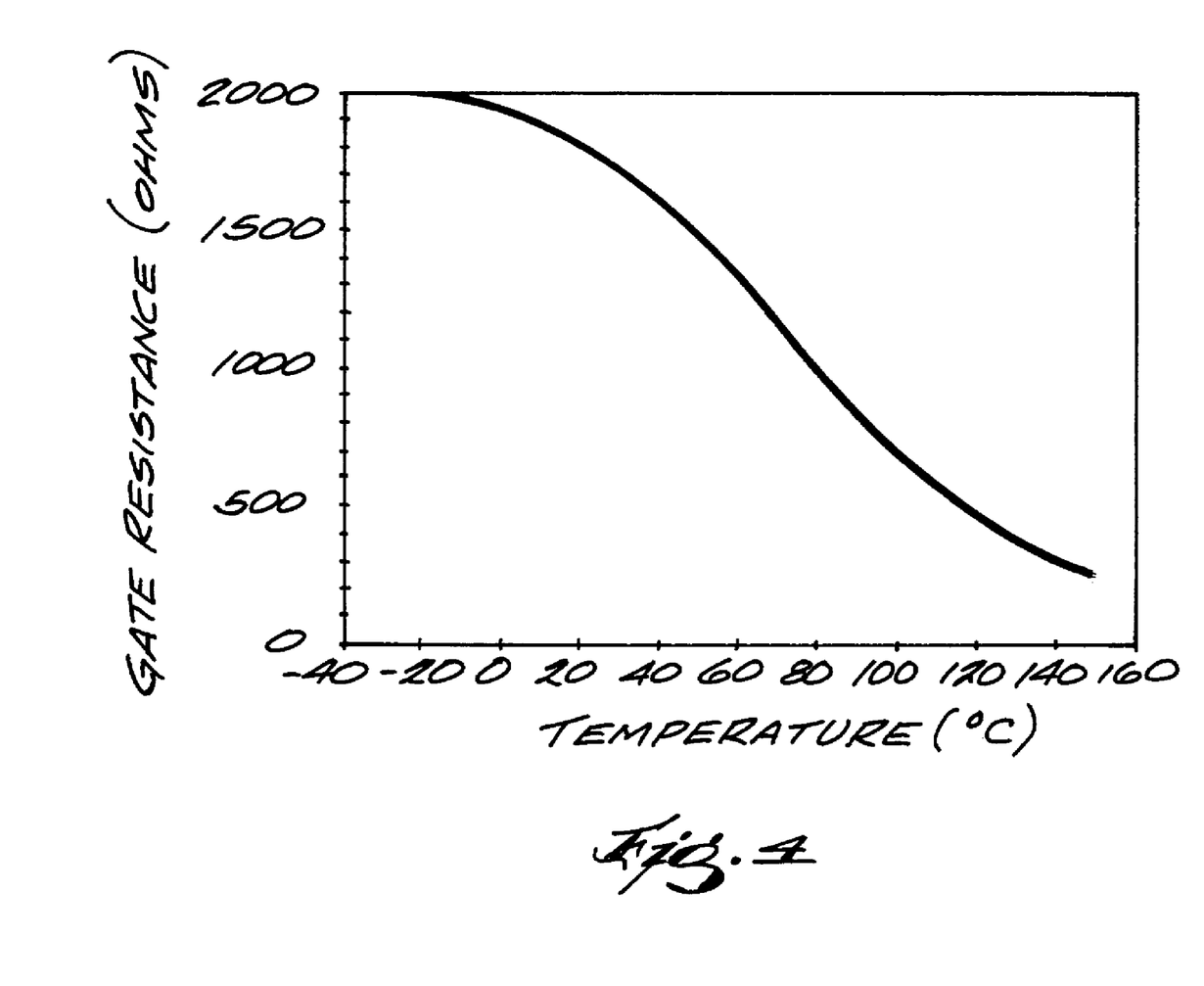
FIG. 4 illustrates the effective gate resistance of a switch versus temperature in one embodiment of the invention.

The input circuit 34 receives the control signal 110, filters and modifies the control signal 110, and delivers the control signal 110 to the switch 98. The input circuit 34 includes a filter 38. During the filtering and modification of the control signal 110, the control signal 110 is partially diverted to the capacitor 50 to decrease the power of the signal to the switch 98. In the embodiment shown, the resistor 42, the temperature-dependent resistor 46, and the capacitor 50 behave as an RC filter, which has an RC time constant. The resistance of the temperature-dependent resistor 46 varies with the air or surrounding temperature. At normal or ambient temperatures and as may be best seen by reference to FIG. 4, the value of the temperature-dependent resistor 46 is maintained at or near its given value. At higher temperatures, the temperature-dependent resistor 46 value decreases. A typical ambient range is from about −40° C. to about 85° C.

The temperature-dependent resistor 46 and resistor 42 may be viewed as a single Thevenin equivalent resistor having a resistance determined by Equation 1 below.

Equation 1:

$$R_E = \frac{R1 \times RT}{R1 + RT},$$

where $R_E$ is the equivalent resistance and R1 is the value of resistor 42 and RT is the value of temperature-dependent resistor 46. As the value of the temperature-dependent resistor 46 varies, the RC time constant, where $R_E$=R and C is the capacitance of the capacitor 50, also varies. At higher temperatures, the RC time constant is lower in value than at normal or ambient temperatures. A lower RC time constant indicates that the time to discharge a capacitor is relatively short or fast. Likewise, a higher RC time constant indicates that the time to discharge a capacitor is long or slow. A lower RC time constant translates to a faster edge transition of the control signal 110, i.e., the time from peak to trough or trough to peak is shorter.

The RC time constant affects the switching time (i.e., the time it takes to transition from a peak to a trough or trough to a peak) of the switch 98. As the switching time increases (i.e., the transition from peak to trough or vice versa gets slower) the amount of heat generated by the switch 98 increases. At a higher temperature, the switch 98 is transitioning from an on/off state more quickly (due to the decrease in value of the RC time constant) than at a lower temperature. The switching time is deliberately slowed down to limit electromagnetic radiation, which may cause interference with various devices in the vehicle 10 such as the radio 18, i.e., as an EMI countermeasure. But this improvement in the EMC behavior causes additional heat to be dissipated in the electronic control unit 22. In embodiments where the switch 98 is located in the housing of the electronic control unit 22, and at high ambient temperatures the heat accumulated in the electronic control unit 22 may increase to an unacceptable level. At higher temperatures, less natural heat dissipation is possible. The additional heat may exceed the maximum thermal load that the electronic circuit 30 is designed to handle. Under these circumstances, the switching transition times may be decreased, which will prevent the ECU from exceeding its thermal limits, but may increase radiated emissions.

When the switch 98 is in the on state, current (as modulated by the control signal 110) flows from the first input 90 in the path 82 through the transistor 78, the inductor 66, the resistor 70, and switch 98 to ground. The current through the inductor 66, the resistor 70, and the module 62 adjusts the power steering control of the vehicle 10. When the switch 98 is in the off state, the current continues to travel through the inductor 66 in the direction of the path 82 from the transistor 78 through the inductor 66 and the resistor 70 to the diode 86. The diode 86 acts as a re-circulation diode to maintain current flow in the driver circuit 74.

To summarize the operation of the electronic control unit used in a power steering system, at extremely high environmental or surrounding temperatures, which are less likely to be encountered, the value of the temperature-dependent resistor 46 decreases, which also decreases the resulting RC time constant. The lower RC time constant value translates into a faster edge transition of the control signal 110, which results in a quicker switching time of the switch 98. At less extreme operating conditions, the switching time of the switch 98 is slowed, reducing potential EMI with the radio 18 or other vehicular systems (not shown). Under extreme operating temperatures, the faster switching time of the switch 98 creates less heat than when the switch operates at lower transition speeds, but increases the likelihood of EMC issues with the radio 18 for example.

At normal, ambient, or slightly elevated temperatures, the value of $R_E$ of the temperature-dependent resistor network 60 is maintained at or around its given value, leading to a higher RC time constant value than at higher temperatures. The higher RC time constant translates into a slower edge transition of the control signal 110, which results in a slower switching time of the switch 98. The slower switching time of the switch 98 generates more heat, but since the ambient temperature is lower, the electronic circuit 30 can dissipate the entire thermal load through heat sinks, cooling fins, natural convection, and the like.

In another embodiment, the electronic control unit may be used in a braking system of the vehicle 10. Instead of the module 62 being used for a power steering application, the module 62 is used for a braking system. The processor 26 receives data 106, e.g., vehicle speed, braking input, and wheel slippage. Based on the data 106, the processor 26 transmits a control signal 110 to the input circuit 34. The input circuit 34 filters and modifies the control signal 110, and delivers the control signal 110 to the switch 98.

As can be seen from the above, one embodiment of the invention provides an effective EMI countermeasure at normal or ambient temperatures, but one that is less effective at extremely high temperatures. The trade-off between temperature and EMC leads to a less expensive housing for the electronic control unit 22 because the electronic circuit 30 requires less heat dissipation measures. The invention also allows for a less expensive or smaller heat sink. The invention may also allow for a less expensive or smaller transistor (T2) and driver circuit. Various features and aspects of the invention are set forth in the following claims.

What is claimed is:

1. A controller for controlling an actuator, the controller comprising:
    an input circuit configured to receive an input signal, the input circuit including
        a first component that provides a resistance,
        a second component coupled in parallel with the first component, the second component having a temperature-dependent resistance, and
        a third component that provides a capacitance,
    the input circuit generating an output signal from the input signal using the first, second, and third components, and the first, second, and third components connected to each other to behave as a filter having an RC time constant; and
    a switch receiving the output signal from the input circuit and configured to change from a first state to a second state in which the actuator and the switch form a circuit path, thereby controlling the actuator according to the RC time constant of the input circuit.

2. A controller as claimed in claim 1, wherein the temperature-dependent resistance of the second component decreases as the temperature surrounding the second component increases.

3. A controller as claimed in claim 1, wherein the input signal comprises a control signal, the control signal having a plurality of peaks and a plurality of troughs and a plurality of edges, each edge running from one of the peaks to one of the troughs or one of the troughs to one of the peaks.

4. A controller as claimed in claim 1, wherein the RC time constant changes according to a value of the second component.

5. A controller as claimed in claim 4, wherein the RC time constant is lower when the value of the second component is lower.

6. A controller as claimed in claim 5, wherein the edges of the control signal have a slope that is determined by the RC time constant.

7. A controller for controlling an actuator, the controller comprising:
    an input circuit configured to receive an input signal, the input circuit including
        a first component that provides a resistance,
        a thermistor coupled in parallel with the first component, the thermistor providing a temperature-dependent resistance, and
        a third component that provides a capacitance,
    the input circuit configured to generate an output signal from the input signal using the first and second components and the thermistor; and
    a switch connected to the input circuit to receive the output signal and configured to change from a first state to a second state in which the actuator and the switch form a circuit path, thereby controlling the actuator according to an RC time constant determined by the input circuit.

* * * * *

UNITED STATES PATENT AND TRADEMARK OFFICE
CERTIFICATE OF CORRECTION

| | | |
|---|---|---|
| PATENT NO. | : 7,251,553 B2 | |
| APPLICATION NO. | : 10/427070 | |
| DATED | : July 31, 2007 | |
| INVENTOR(S) | : Robert Kaster | |

It is certified that error appears in the above-identified patent and that said Letters Patent is hereby corrected as shown below:

Column 2, line 65 Insert the following after "well as"

-- additional items. The terms "mounted," "connected," and "coupled" are used broadly and encompass both direct and indirect mounting, connecting, and coupling. Further, "connected" and "coupled" are not restricted to physical or mechanical connections or couplings.

Figure 1:
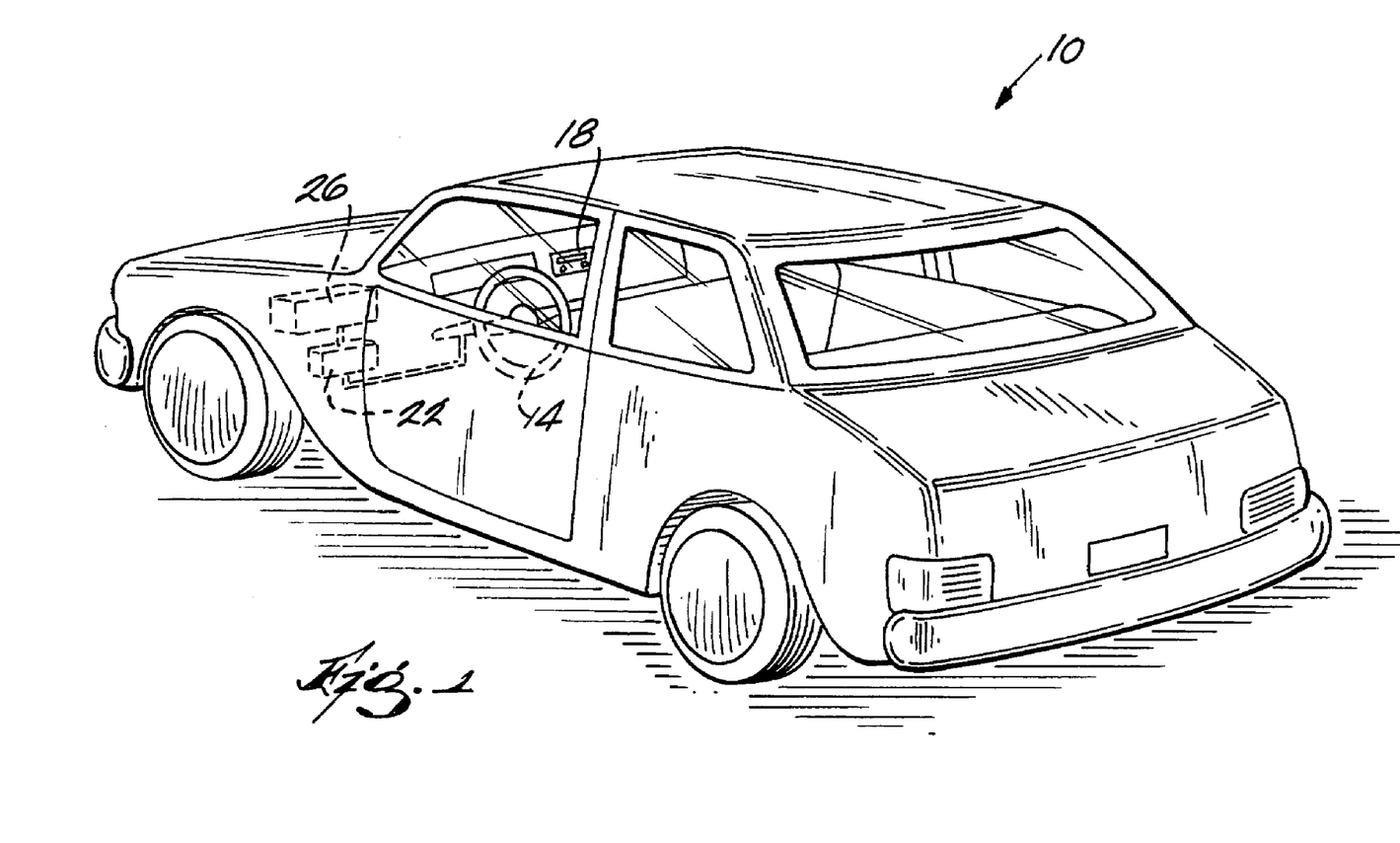
FIG. 1 illustrates an exemplary vehicle and one embodiment of the invention located in the vehicle.

Referring to the drawings, FIG. 1 illustrates an exemplary vehicle 10 including a steering wheel 14 and a radio 18. The vehicle 10 includes an electronic control unit 22 (sometimes referred to as an "ECU" herein) connected to the steering wheel 14. The electronic control unit 22 is also connected to a processor 26. The electronic control unit 22 and the processor 26 may by mounted on or located in any convenient location within the vehicle 10. The processor 26 could also be mounted in the electronic control unit 22. It should be noted that the term vehicle, as used herein, is defined as including any vehicle, including overland vehicles such as, cars, trucks, vans, buses, tractors, motorcycles, or similar devices. It should also be noted that the term electronic control unit, as used herein, is defined as any electronic circuit that controls or monitors any component, module, or system of a vehicle. The term processor is used herein to encompass one or more hardware or software components implemented for receiving, modifying, storing, and/or outputting data or information. One of ordinary skill in the art will understand that a plurality of components may be utilized to realize the processor functions, including application specific integrated circuits ("ASICs"), micro-controllers/processors or other semiconductor-based components, other solid state components, or future developed processing technology.

The electronic control unit 22 may be used, for example, in a power steering system of the vehicle 10 or in a braking system of the vehicle 10. However, the invention should not be considered as limited to the uses disclosed herein.

UNITED STATES PATENT AND TRADEMARK OFFICE
CERTIFICATE OF CORRECTION

PATENT NO. : 7,251,553 B2
APPLICATION NO. : 10/427070
DATED : July 31, 2007
INVENTOR(S) : Robert Kaster It is certified that error appears in the above-identified patent and that said Letters Patent is hereby corrected as shown below:

Column 2, line 65...cont'd

The electronic control unit 22 includes an electronic circuit 30. The electronic circuit 30 is schematically illustrated in FIG. 2. As Illustrated in FIG. 2, the electronic circuit 30 includes an input circuit 34. The input circuit 34 includes a filter 38 having a resistor 42 (R1), a thermosensor such as a thermistor or temperature-dependent resistor 46 (RT) and a capacitor 50 (C). The temperature-dependent resistor 46 may be implemented with other devices, circuits, or components that measure or detect a temperature, such as, for example, a thermocouple, a diode, a digital microprocessor, a resistance thermal --

Signed and Sealed this

Twentieth Day of November, 2007

JON W. DUDAS
*Director of the United States Patent and Trademark Office*